(12) United States Patent
Ware, Sr.

(10) Patent No.: US 6,227,425 B1
(45) Date of Patent: May 8, 2001

(54) GOLF CART WITH A DESK SYSTEM

(76) Inventor: Earl Ware, Sr., 1600 S. MacDill Ave., #201, Tampa, FL (US) 33629

( * ) Notice: Subject to any disclaimer, the term of this patent is extended or adjusted under 35 U.S.C. 154(b) by 0 days.

(21) Appl. No.: 09/289,303

(22) Filed: Apr. 9, 1999

(51) Int. Cl.[7] ....................................................... B60R 7/00
(52) U.S. Cl. .................... 224/276; 224/274; 280/DIG. 5
(58) Field of Search ..................... 280/DIG. 6, DIG. 5; 224/274, 276, 918, 919; 248/452

(56) References Cited

U.S. PATENT DOCUMENTS

| | | | | |
|---|---|---|---|---|
| D. 195,472 | * | 6/1963 | Zimmers | D34/5 |
| 4,453,788 | * | 6/1984 | Russell | 312/231 |
| 4,756,552 | * | 7/1988 | Martinez et al. | 280/774 |
| 4,974,805 | * | 12/1990 | Douglas | 248/447.1 |
| 5,083,736 | * | 1/1992 | McCoy | 248/452 |
| 5,385,283 | * | 1/1995 | Shioda | 224/276 |
| 5,435,474 | * | 7/1995 | Lin | 224/274 |
| 5,489,112 | * | 2/1996 | Mohr | 281/143 |
| 5,848,742 | * | 12/1998 | Wang | 224/274 |
| 6,041,986 | * | 3/2000 | Wu | 224/274 |
| 6,059,158 | * | 5/2000 | Hsu | 224/274 |

* cited by examiner

*Primary Examiner*—J. J. Swann
*Assistant Examiner*—James S. McClellan

(57) ABSTRACT

A golf cart with a desk system including a cylindrical support column configured in appearance to a steering column with a lower end securable to the floorboard of a golf cart to extend essentially parallel with the steering column of the golf cart but laterally offset therefrom and locatable in front of and above the passenger seat. A golf cart desk has an enlarged generally rectilinear lower section with a lower plate and peripheral side plates secured to the upper end of the column through the lower surface of the lower plate. A smaller generally rectilinear upper section has an upper plate and downwardly extending side plates. A hinge couples the upper and lower section for selective opening and closing of the upper section with regard to the lower section.

7 Claims, 4 Drawing Sheets

GOLF CART WITH A DESK SYSTEM

BACKGROUND OF THE INVENTION

1. Field of the Invention

The present invention relates to a golf cart with a desk system for the retention of golf related objects and more particularly pertains to providing convenience for golfers along with increased safety.

2. Description of the Prior Art

The use of golf carts and accessories of known designs and configurations is known in the prior art. More specifically, golf carts and accessories of known designs and configurations heretofore devised and utilized for the purpose of pampering golfers through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,453,788 to Russell discloses a portable desk. U.S. Pat. No. 4,974,805 to Douglas discloses a clipboard for steering wheel. U.S. Pat. No. 4,989,767 to Buschbom discloses a golf cart cooler. U.S. Pat. No. 5,083,736 to McCoy discloses a pencil holder for golf carts. Lastly, U.S. Pat. No. 5,387,010 to Mohr discloses an apparatus for securing looseleaf pages to a golf cart.

While these devices fulfill their respective, particular objectives and requirements, the aforementioned patents do not describe a golf cart with a desk system for the retention of golf related objects that provides convenience for golfers along with increased safety.

In this respect, the golf cart with a desk system for the retention of golf related objects according to the present invention substantially departs from the conventional concepts and designs of the prior art, and in doing so provides an apparatus primarily developed for the purpose of providing convenience for golfers along with increased safety.

Therefore, it can be appreciated that there exists a continuing need for a new and improved golf cart with a desk system for the retention of golf related objects which provides convenience for golfers along with increased safety. In this regard, the present invention substantially fulfills this need.

SUMMARY OF THE INVENTION

In view of the foregoing disadvantages inherent in golf carts and accessories of known designs and configurations now present in the prior art, the present invention provides an improved golf cart with a desk system for the retention of golf related objects. As such, the general purpose of the present invention, which will be described subsequently in greater detail, is to provide a new and improved golf cart with a desk system for the retention of golf related objects and method which has all the advantages of the prior art and none of the disadvantages.

To attain this, the present invention essentially comprises a new and improved golf cart with a desk system. First provided is a body. Beneath the body are a floorboard and wheels. Next provided is a bench. The bench has two laterally spaced seats for at least two occupants, a driver and a passenger. A steering assembly is next provided. The steering assembly has a steering column. The steering column extends upwardly from the floorboard of the body. A steering wheel is provided at the top of the steering column. The column is angled inwardly toward the bench adjacent to the driver seat. A supplemental cylindrical support column is configured in appearance to the steering column. The supplemental cylindrical support column has a radially enlarged lower end. Apertures are provided through the lower end of the supplemental support column for receiving coupling bolts. The coupling bolts secure the support column to the floorboard of the body. The support column extends essentially parallel with, but laterally offset from, the steering column. The support column is located in front of and above the passenger seat. Next provided is a golf cart desk. The desk is adapted to hold golf balls, tees, markers, scorecards, pencils, wristwatches, bandages and like objects. The desk has an enlarged generally rectilinear lower section. The lower section has a lower plate and peripheral side plates. The desk is secured to the upper end of the supplemental column through the lower surface of the lower plate. Generally C-shaped handles extend laterally outwardly from the side plates. The handles function to be held by a passenger for stability. A smaller generally rectilinear upper section has an upper plate. The upper section also has downwardly extending side plates. The side plates have a depth less than the depth of the lower section. A hinge couples the upper and lower sections for selective opening and closing of the upper section with regard to the lower section. The upper and lower sections are covered interiorly with a lining of fabric, preferably velvet. Next provided is a holder. An enlarged forward portion and a smaller rearward portion of the holder are mounted on the upper surface of the upper plate. A coil spring is provided and is adapted to resiliently bias the forward portion to a downwardly oriented position. In this manner a scorecard may be held on the top surface of the upper section of the desk. A downward force on the rearward portion functions to lift the forward portion. In this manner the scorecard may be removed. The support column and the desk and the holder are fabricated of a rigid synthetic material selected from the class of rigid synthetic materials including Lexan, polyvinylchloride, carbon composite materials, and fiberglass.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved golf cart with a desk system for the retention of golf related objects has all of the advantages of the prior art golf carts of known designs and configurations and none of the disadvantages.

It is another object of the present invention to provide a new and improved golf cart desk system for the retention of golf related objects which may be easily and efficiently manufactured and marketed.

It is further object of the present invention to provide a new and improved desk system for a golf cart for the retention of golf related objects which is of durable and reliable constructions.

An even further object of the present invention is to provide a new and improved golf cart with a desk system for the retention of golf related objects which is susceptible of a low cost of manufacture with regard to both materials and labor, and which accordingly is then susceptible of low prices of sale to the consuming public, thereby making such golf cart with a desk system economically available to the buying public.

Even still another object of the present invention is to provide a golf cart with a desk system for the retention of golf related objects for providing convenience for golfers along with increased safety. Lastly, it is an object of the present invention to provide a new and improved golf cart with a desk system comprising a cylindrical support column configured in appearance to a steering column with a lower end securable to the floorboard of a golf cart to extend essentially parallel with the steering column of the golf cart but laterally offset therefrom and locatable in front of and above the passenger seat, a golf cart desk having an enlarged generally rectilinear lower section with a lower plate and peripheral side plates secured to the upper end of the column through the lower surface of the lower plate, and a smaller generally rectilinear upper section having an upper plate and downwardly extending side plates and with a hinge coupling the upper and lower section for selective opening and closing of the upper section with regard to the lower section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
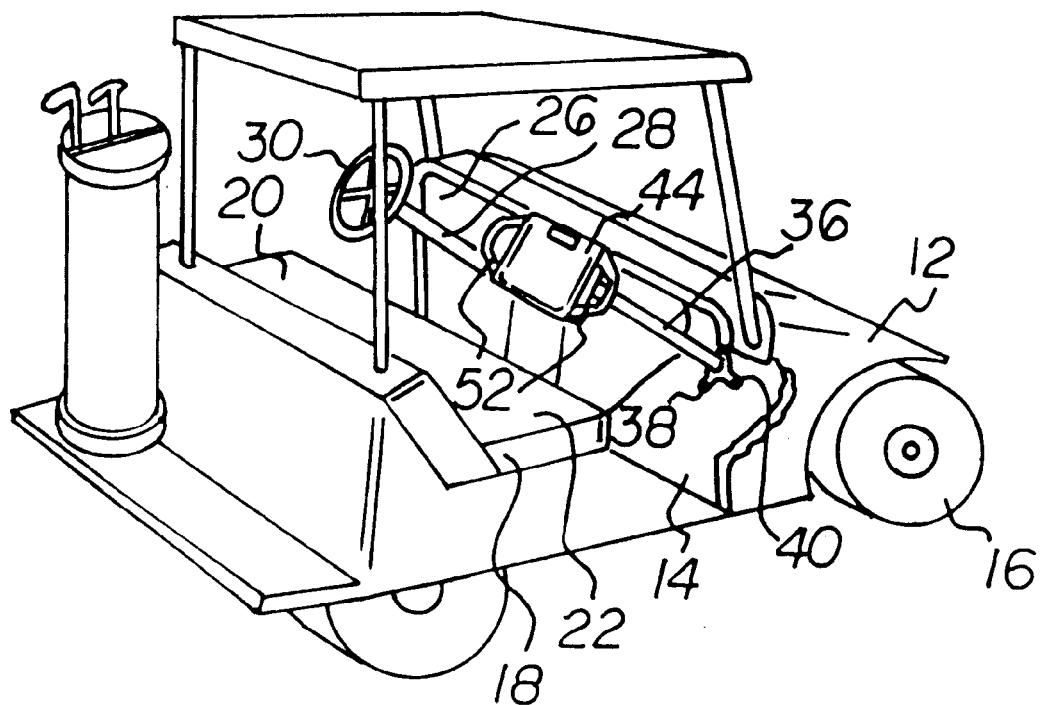
FIG. 1 is a perspective view of a portion of a new and improved golf cart with a desk system constructed in accordance with the principles of the present invention.
Figure 2:
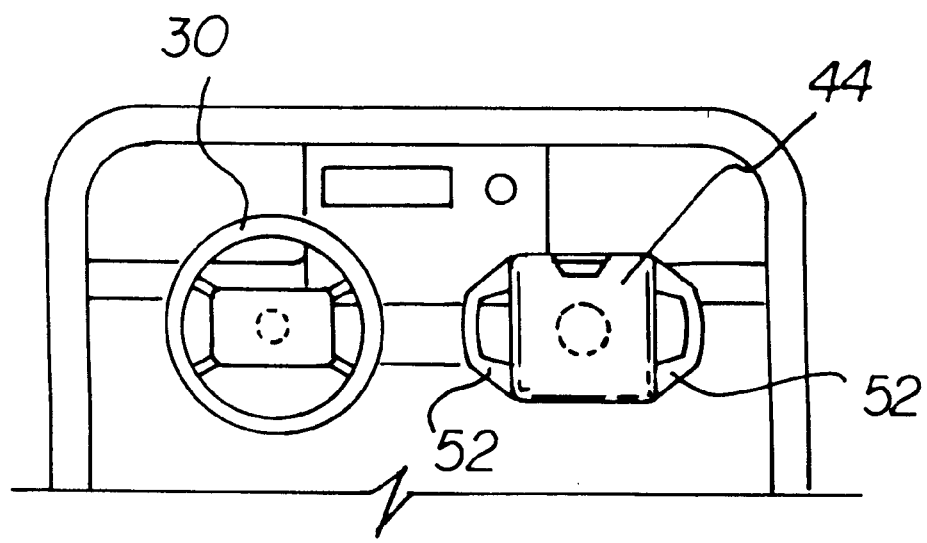
FIG. 2 is a top elevational view looking down on the steering wheel and desk as shown in FIG. 1.
Figure 3:
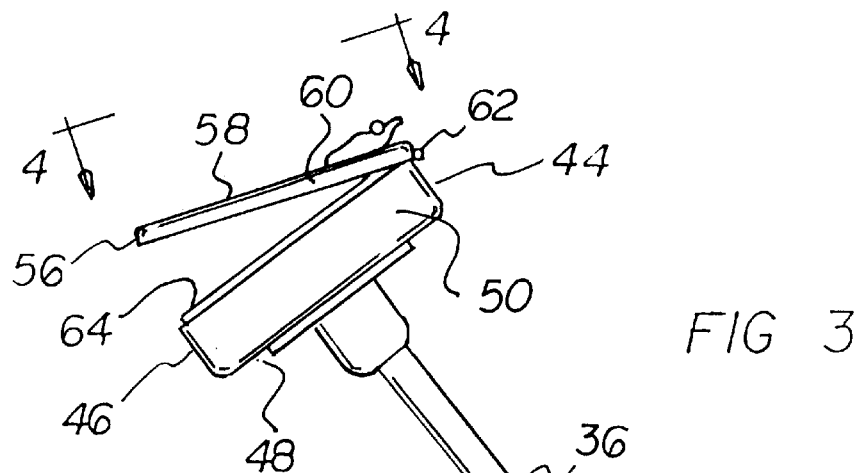
FIG. 3 is an elevational view of the supplemental cylindrical support column and desk.
Figure 4:
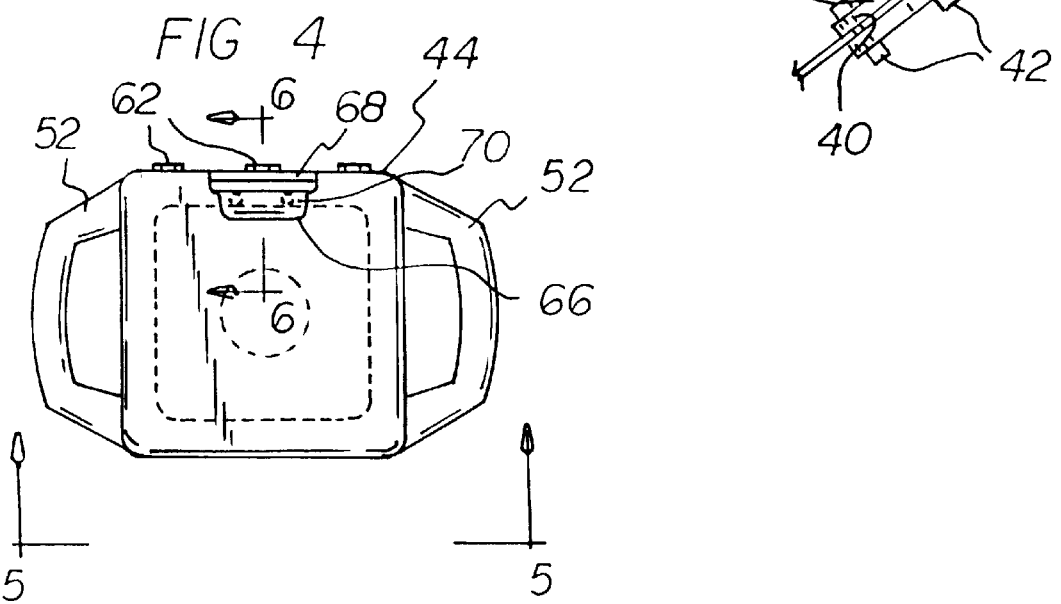
FIG. 4 is a cross sectional view taken along line 4—4 of FIG. 3.
Figure 5:
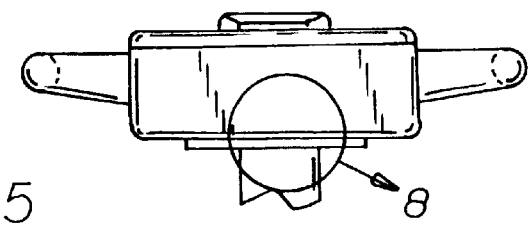
FIG. 5 is a cross sectional view taken along line 5—5 of FIG. 4.
Figure 6:
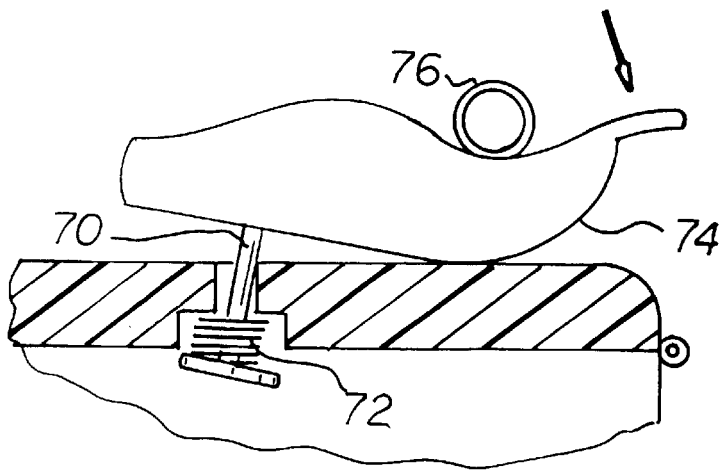
FIG. 6 is an enlarged cross sectional view taken along line 6—6 of FIG. 4.
Figure 7:
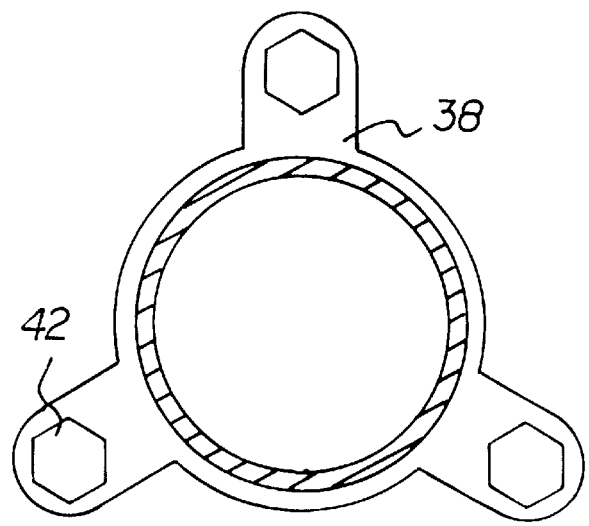
FIG. 7 is a cross-sectional view taken along line 6—6 of FIG. 3.
Figure 8:
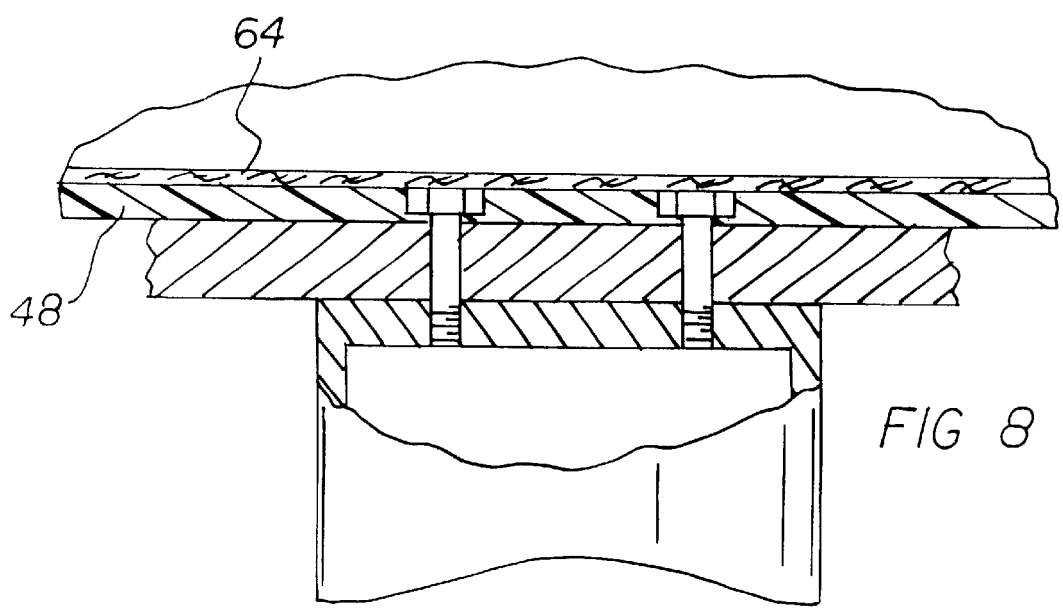
FIG. 8 is a cross sectional view taken at circle 8 of FIG. 5.

With reference now to the drawings, and in particular to FIG. 1 thereof, the preferred embodiment of the new and improved golf cart with a desk system embodying the principles and concepts of the present invention and generally designated by the reference numeral 10 will be described.

The present invention, the golf cart with a desk system for the retention of golf related objects 10 is comprised of a plurality of components. Such components in their broadest context include a body, a steering assembly, a cylindrical support column, a golf cart desk, and a smaller generally rectilinear upper section. Such components are individually configured and correlated with respect to each other so as to attain the desired objective.

First provided is a body 12. Beneath the body are a floorboard 14 and wheels 16. Next provided is a bench 18 mounted to and located above the floorboard. The bench has two laterally spaced seats 20, 22 for at least two occupants, a driver and a passenger.

A steering assembly 26 is next provided. The steering assembly has a steering column 28. The steering column extends upwardly from the floorboard of the body. A steering wheel 30 is provided at the top of the steering column. The column is angled inwardly toward the bench adjacent to the driver seat 20. Such arrangement is generally conventional.

A supplemental cylindrical support column 36 is next provided. It is configured in appearance to the steering column 28. The supplemental cylindrical support column has a radially enlarged lower end 38. Apertures 40 are provided through the lower end of the supplemental support column for receiving coupling bolts 42. The coupling bolts extend through aligned apertures in the floorboard and support column to secure the support column to the floorboard of the body.

The support column 36 extends essentially parallel with, but laterally offset from, the steering column. The support column is located in front of and above the passenger seat 22.

Next provided is a golf cart desk 44. The desk is adapted to hold golf balls, tees, markers, scorecards, pencils, wristwatches, bandages and like objects. The desk has an enlarged generally rectilinear lower section 46. The lower section has a lower plate 48 and peripheral side plates 50 with an opening on the top. The desk is secured to the upper end of the supplemental column through the lower surface of the lower plate. Generally C-shaped handles 52 extend laterally outwardly from the side plates. The handles function to be held by a passenger for stability. Such holding may be needed if the golf art is driven over a rough surface or when entering or leaving the golf cart.

Next provided is a smaller generally rectilinear upper section 56. The upper section has an upper plate 58. The upper section also has downwardly extending side plates 60 with an opening on the bottom. The side plates have a depth less than the depth of the lower section. A hinge 62 couples the upper and lower sections for selective opening and closing of the upper section with regard to the lower section. The upper and lower sections are preferably covered interiorly with a lining 64 of fabric, preferably velvet.

Next provided is a holder 65. An enlarged forward portion 66 and a smaller rearward portion 68 of the holder are mounted on the upper surface of the upper plate. A coil spring 72 encompasses a bolt 70. The bolt has an upper end secured to the lower surface of the holder 65 and extends through an aperture in the upper surface of the upper plate. The bolt has an enlarged lower end to support the coil spring. This relationship preferably includes side by side spring and is adapted to resiliently bias the forward portion to a downwardly oriented position. In this mannner, a scorecard may be held on the top surface of the upper section of the desk. A downward force on the rearward portion functions to lift the forward portion whereby the scorecard may be removed. As a further convenience, a wire loop 76, or preferably two spaced wire loops, are positioned on the holder for the removable receipt of a pencil for scorekeeping.

The support column and the desk and the holder are fabricated of a rigid synthetic material selected from the class of rigid synthetic materials including Lexan, polyvinylchloride, carbon composite materials, and fiberglass.

Figure 9:
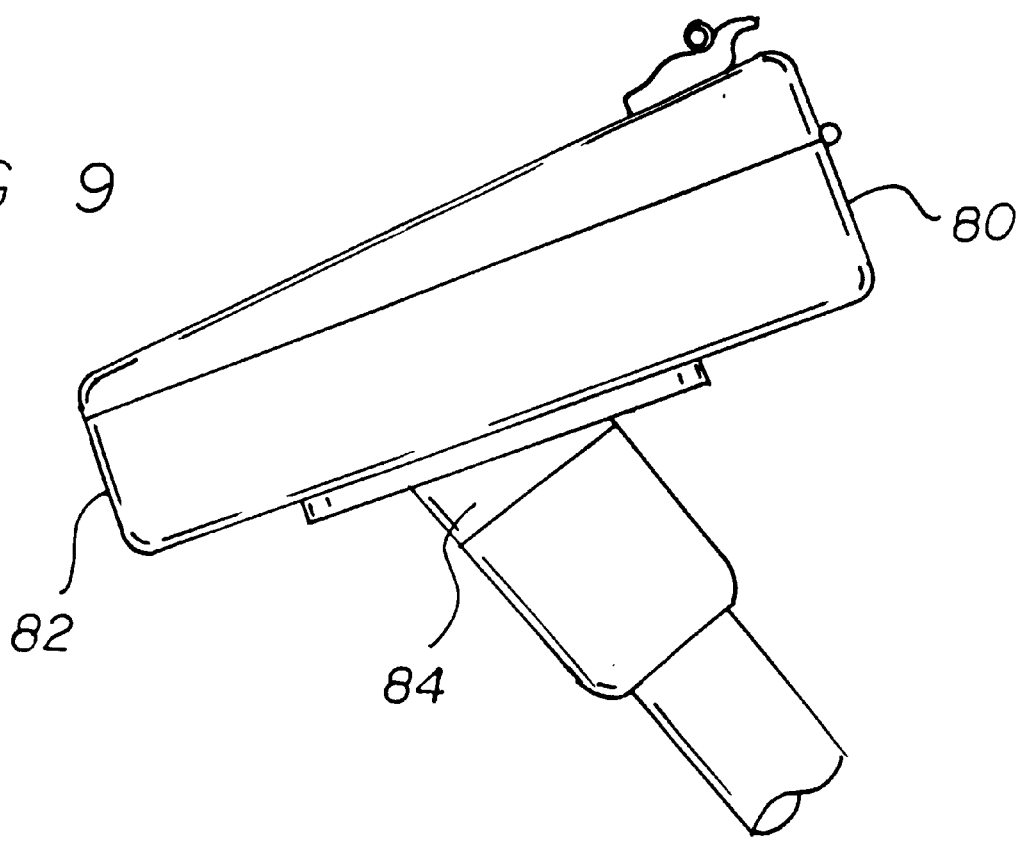
FIGS. 9 and 10 are a side elevational view and an exploded perspective illustration of an alternate embodiment of the invention.
Figure 10:
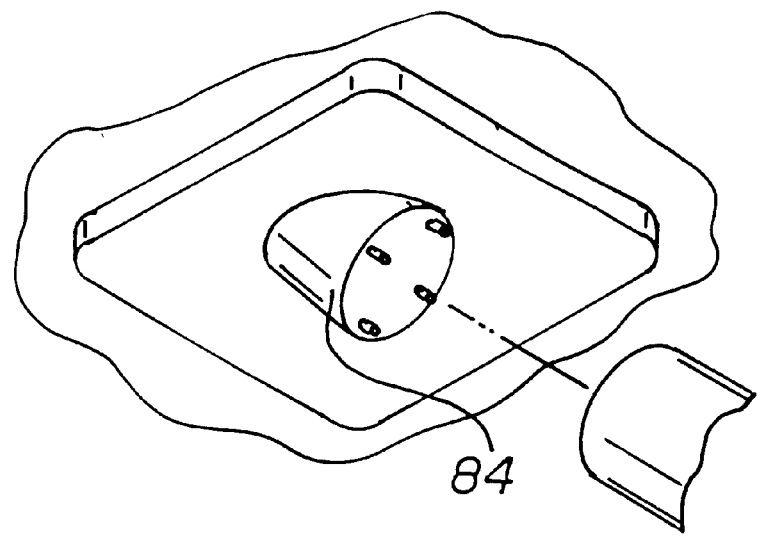

An alternate form of the invention is shown in FIGS. 9 and 10. In such embodiment, the rearward section 80 of the desk is higher than the forward section 82 with a cylindrical wedge 84 therebeneath. This relationship allows greater utility in storing objects while the wedge holds the writing top surface of the desk at an appropriate angle for use. The wedge could be eliminated with the top of the post angled to provide the proper angle for the desk.

It can, therefore, be seen that this invention provides an improved golf cart with a desk system for the retention of golf related objects providing convenience for golfers along with increased safety. Numerous and varied items, such as golf balls, tees, markers, scorecards, pencils, paper, wristwatches, medications, and bandages, of convenience to a golfer are readily accessible within the golf cart desk system. The tray can be adapted to hold various numbers and shapes of items. Quick and easy access to these items without searching through golf bags or other paraphernalia, is preferable, and in the case of medications, could potentially be life-saving. Lining of the tray with a material, preferably velvet, protects the items placed therein from scratching and also functions to prevent jostling of the items as the golf cart moves.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf cart desk and support comprising:
   a cylindrical support column configured in appearance to a steering column with an upper end and a lower end adapted to be secured to the floorboard of a golf cart and to extend essentially parallel with a steering column of a golf cart but laterally offset therefrom and further adapted to be located in front of and above a passenger seat of a golf cart;
   a golf cart desk having an enlarged generally rectilinear lower section with a lower plate having a central extent and peripheral side plates secured to the upper end of the column, the desk also having peripheral sidewalls; and
   a smaller generally rectilinear upper section having an upper plate and downwardly extending side plates and with a hinge coupling the upper and lower section for selective opening and closing of the upper section with regard to the lower section.

2. A golf cart desk and support as set forth in claim 1 and further including:
   at least one generally C-shaped handle extending laterally outwardly from a side plate.

3. A golf cart desk and support as set forth in claim 1 and further including;
   a holder with an enlarged forward portion and a smaller rearward portion mounted on the upper surface of the upper plate with a coil spring adapted to resiliently bias the forward portion to a downwardly oriented position to hold a scorecard on the top surface of the upper section of the desk but pivotable through a downward force on the rearward portion for the lifting of the forward portion and the removal of the scorecard from therebetween.

4. A golf cart desk and support as set forth in claim 1 wherein the support column and the desk are fabricated of a rigid synthetic material selected from the class of rigid synthetic materials including Lexan, polyvinyl chloride, carbon composite materials, and fiberglass.

5. A golf cart desk and support as set forth in claim 1 wherein the rearward section of the desk is higher than the forward section with a cylindrical wedge therebetween.

6. A golf cart with a desk system comprising, in combination:
   a body having a floorboard and wheels therebeneath, and a bench with two laterally spaced seats for at least two occupants;
   a steering assembly with a steering column extending upwardly from the floorboard of the body and with a steering wheel at the top thereof, the column being angled inwardly toward the bench adjacent to the driver seat;
   a supplemental cylindrical support column configured in appearance to the steering column with a radially enlarged lower end with apertures therethrough and coupling bolts securing the support column to the floorboard of the body, the support column extending essentially parallel with the steering column but laterally offset therefrom and located in front of and above the passenger seat;
   a golf cart desk adapted to hold various items including golf balls, tees, markers, scorecards, pencils, wristwatches and bandages and having an enlarged generally rectilinear lower section with a lower plate and peripheral side plates secured to the upper eand of the supplemental column through the lower surface of the lower plate;

generally C-shaped handles extending laterally outwardly from the side plates thereof for being held by a passenger for stability;

a smaller generally rectilinear upper section having an upper plate and downwardly extending side plates with a depth less than the depth of the lower section and with a hinge coupling the upper and lower section for selective opening and closing of the upper section with regard to the lower section, the upper and lower sections being covered interiorly with a lining of fabric;

a holder with an enlarged forward portion and a smaller rearward portion mounted on the upper surface of the upper plate with a coil spring adapted to resiliently bias the forward portion to a downwardly oriented position to hold a scorecard on the top surface of the upper section of the desk but pivotable through a downward force on the rearward portion for the lifting of the forward portion and the removal of the scorecard from therebetween, the support column and the desk and the holder being fabricated of a rigid synthetic material selected from the class of rigid synthetic materials including Lexan, polyvinylchloride, carbon composite materials, and fiberglass.

7. The system as set forth in claim 6, wherein the lining is velvet.

* * * * *